May 28, 1957 W. J. TURNER, JR., ET AL 2,793,527
SOIL MOISTURE TESTING APPARATUS
Filed Feb. 4, 1955 2 Sheets-Sheet 1
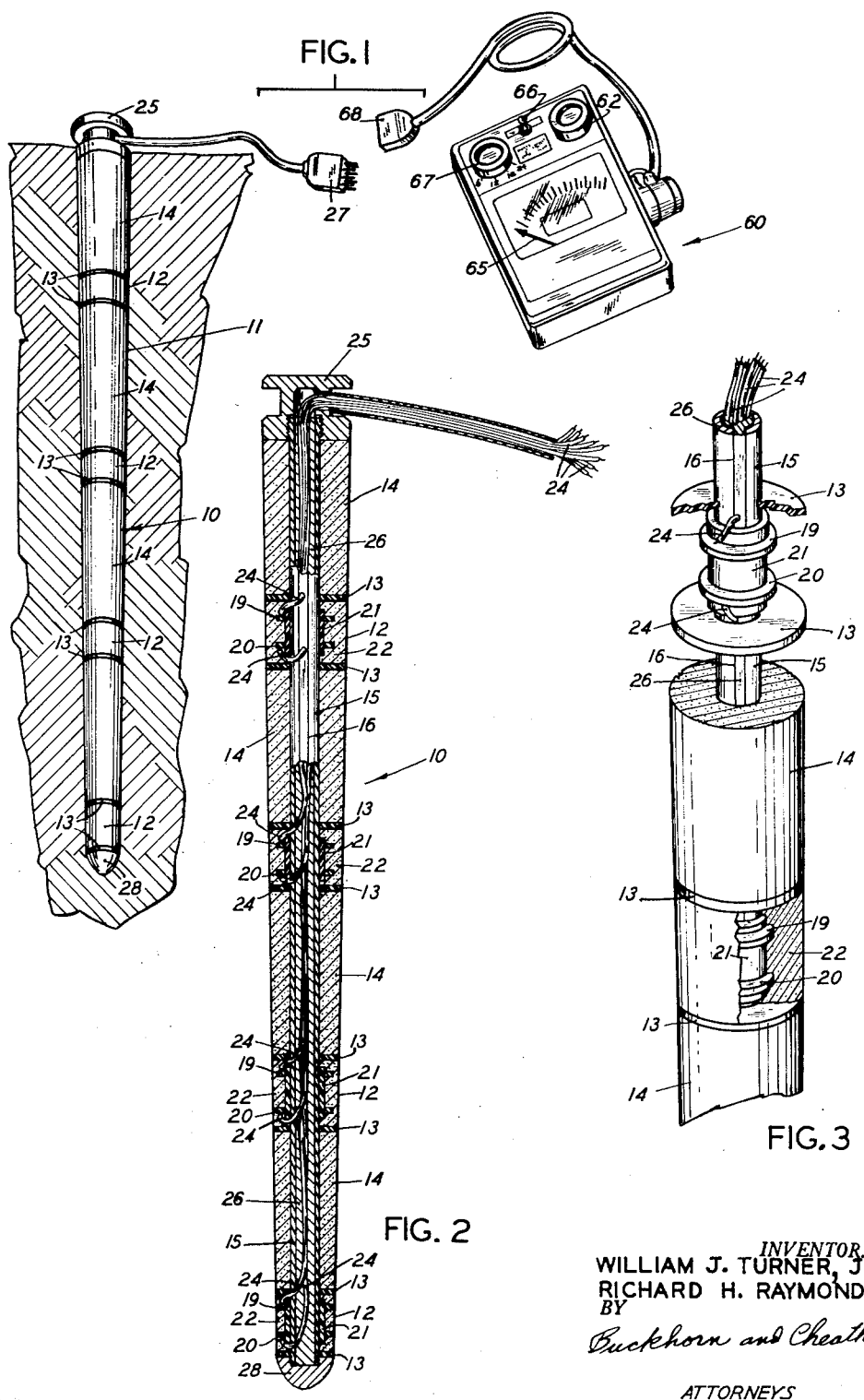
INVENTOR
WILLIAM J. TURNER, JR.
RICHARD H. RAYMOND
BY
Buckhorn and Cheatham
ATTORNEYS May 28, 1957 W. J. TURNER, JR., ET AL 2,793,527
SOIL MOISTURE TESTING APPARATUS
Filed Feb. 4, 1955 2 Sheets-Sheet 2

INVENTOR.
WILLIAM J. TURNER, JR.
RICHARD H. RAYMOND
BY
*Buckhorn and Cheatham*

ATTORNEYS

United States Patent Office 2,793,527
Patented May 28, 1957

2,793,527

SOIL MOISTURE TESTING APPARATUS

William J. Turner, Jr., Oswego, and Richard H. Raymond, Portland, Oreg., assignors to Rayturn Machine Corporation, Portland, Oreg., a corporation of Oregon Application February 4, 1955, Serial No. 486,192

13 Claims. (Cl. 73—73)

The present invention relates to apparatus for measuring the moisture content of soil, and more particularly to apparatus facilitating the measurement of the moisture content of soil at various depths below the surface thereof.

It is desirable, in irrigation practice, to be able readily to determine the moisture content of the soil at any given time and at various depths. Such determination is desirable, in the first instance, so as to indicate when irrigation is necessary to maintain a sufficient moisture supply for the growing of crops. It is also a value to be able to determine the moisture content at various depths in the soil so that the irrigation may be regulated to supply sufficient water and at a sufficient rate to obtain the desired moisture distribution through the soil. In many instances it is desirable to know the moisture content of the soil so that water is not applied wastefully and to the detriment of certain crops which can tolerate only certain amounts of moisture.

One of the methods practiced heretofore to determine the moisture content of the soil has been to remove a sample of the soil and thereafter dry it and determine by comparative weighing the moisture content of the sample. Such a procedure is time consuming and wholly unsuitable for ordinary farming practices.

In accordance with another method, electrodes have been embedded in a block of moisture absorbent material, the conductivity of which increases with increasing moisture content. Such a block has been buried in the soil wherein it absorbs moisture from or gives moisture up to the soil and the changing conductivity of the block measured by conductors extending upward to the ground surface. However, to install such blocks it was necessary to excavate a hole which was filled in after the block was inserted in the hole, whereby the block was surrounded with disturbed soil, and the readings obtained were not representative of the conditions in the undisturbed soil. Moreover, considerable time was required to install such blocks whereby the expense of installation is considerable.

It is an object of the present invention to provide apparatus which is simple in construction and which may be used conveniently for accurately determining the moisture content of soil.

It is a further object of the invention to provide apparatus which may be conveniently and easily installed in the soil for determining the moisture content thereof at various depths.

Another object is to provide an apparatus for measuring soil moisture content which may be installed in the soil without disturbing the same.

A further object of the invention is to provide an inexpensive but durable device of the character described adapted to be embedded in the soil and left there between moisture determinations.

Other objects and advantages will become more apparent hereinafter.

In accordance with an illustrated embodiment of the invention, there is provided an elongate tapered stake adapted to be inserted in a cooperatively tapered hole augered in the soil, so that the stake may be inserted into firm engagement with the walls of the augered hole. The stake is provided with a series of spaced apart moisture testing cells each comprising a material capable of absorbing moisture from the soil surrounding the cell and exhibiting a change in resistivity as its moisture content changes. Each of the cells is provided with a pair of electrodes, and leads are provided to such electrodes from the top of the stake whereby the resistance changes of the cell material may be measured as the moisture content of the material changes with changing soil moisture content.

For a more detailed description of the invention, reference is made to the following specification taken in connection with the accompanying drawings wherein:

Fig. 1 is a perspective view showing a stake of the invention inserted in the soil and showing an instrument arranged for taking test readings;

Fig. 2 is a longitudinal, sectional view of the embodiment of Fig. 1;

Fig. 3 is an enlarged, fragmentary view of the stake of Figs. 1 and 2 broken away to show details thereof;

Figure 4:
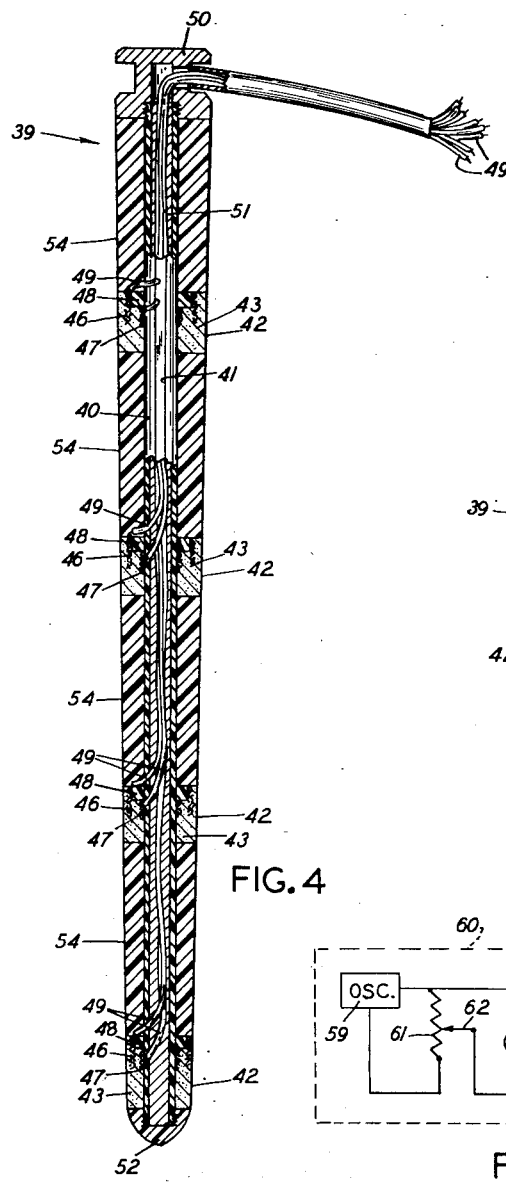
Fig. 4 is a longitudinal section showing another embodiment of the invention.

Referring first to Figs. 1 through 3, the illustrated embodiment comprises a series of frusto-conical sections consisting of moisture testing cells 12, insulating sections 13, and spacer sections 14 arranged in end to end relation to form a smoothly tapered stake 10 adapted to be inserted in a cooperatively tapered hole previously bored in the soil indicated at 11. The sections 12, 13, 14 are mounted on a tubular core element 15 preferably formed of a moisture impervious, electrical insulating material and provided with a longitudinally extending slit or opening 16 in the wall thereof. The moisture testing cells 12 may be spaced at desired intervals along the core 15 so that when the stake 10 is inserted in the soil, the cells will be at various desired depths below the ground surface. The spacing may be, for example, six inches, whereby the moisture content of the soil may be measured at 6, 12, 18 and 24 inch depths with a stake having four cells as illustrated. As will become apparent hereinafter, more or fewer moisture testing cells may be provided on the stake and the spacing may be varied as desired.

Each of the moisture testing cells is provided with means for sensing resistivity changes therein which may comprise a pair of electrodes 19, 20 which, in this instance, are illustrated as being axially spaced apart rings mounted on a sleeve 21 which is in turn secured to the core 15. The sleeve 21 is of a suitable electrical insulating material. The electrodes 19, 20 are surrounded by a body 22 of a hygroscopic material which is adapted to absorb moisture from the soil or release moisture thereto as the ratio therebetween varies so as to establish an equilibrium, the material having the further property of varying in conductivity or resistivity as the moisture content of the material varies. An example of such a material is gypsum, and other suitable materials will be obvious to those skilled in the art. Preferably the volume of gypsum in each cell 12 is substantially the same so that each cell will extract substantially the same amount of water from the surrounding soil, thus to have the same drying effect on the portion of the soil surrounding each cell. Thus, the cells are of progressively greater length from the top to the bottom of the stake, as shown in Fig. 2, to accommodate for the progressive reduction in diameter of the cells.

An individual electrical lead wire 24 is provided to each of the electrodes 19, 20 and which leads are carried through the core 15, the wires passing from the respective electrodes inwardly through the opening 16 of the core and then upwardly through a cap 25, which may be threadedly engaged, as shown, or otherwise secured to the top of the core 15, to the terminals of an eight-terminal plug 27. To prevent migration of moisture through the core 15, it may be filled with a wax 26 or similar material after the leads 24 are in place. An end cap 28 may be provided on the lower end of the core 15.

Mounted on the core 15 immediately above and below each of the moisture testing cells 12 are the insulating sections or discs 13 which are formed of an electrical nonconducting, moisture impervious material such as one of the many plastics. The discs 13 isolate the cells and prevent the migration of moisture from one cell to another longitudinally of the stake. To form a uniformly tapered, smooth bodied stake, the spacer sections 14 are provided between the various cells, as shown. Preferably such spacer sections are formed of an inert, non-hygroscopic material. However, in the embodiment illustrated herein, the spacer sections are shown as being formed of gypsum, which is convenient from the standpoint of manufacture since the gypsum of the spacer sections and the cell sections may be formed by casting after the electrodes 19, 20 and discs 13 have been assembled on the core 15. However, with the spacer sections formed of gypsum, occasionally spurious readings result from the reservoir effect provided by such large bodies tending to lose their moisture to the soil at a slower rate than the soil dries out; hence, the moisture content of the soil immediately surrounding the stake will be above that of the general moisture level so that a spuriously high reading may be obtained when the moisture content is measured.

Figure 5:
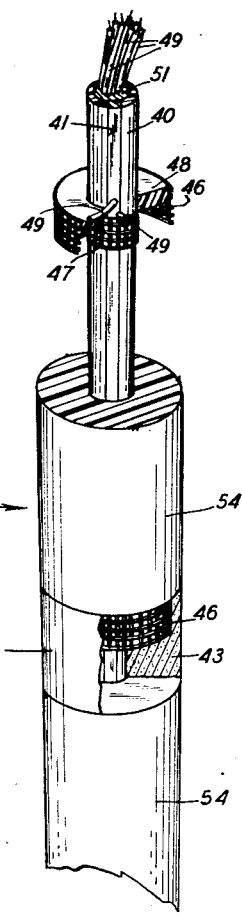
Fig. 5 is an enlarged, fragmentary view of the embodiment of Fig. 4, broken away to show details thereof.

A preferred embodiment of a stake 39 is shown in Figs. 4 and 5, and which stake comprises a core 40, again preferably of an electrical nonconducting, moisture impervious material and provided with a longitudinal slit or opening 41. The stake is again shown with four moisture testing cells indicated by the numeral 42 and spaced apart longitudinally of the stake 39. The moisture testing cells 42 each comprises a frusto-conical body 43 of gypsum or similar material which bodies, as in the previous embodiment, are preferably each of the same volume. Embedded in the body 43 of a cell are a pair of electrodes which, in this instance, are concentric cylindrical elements including an outer electrode 46 of relatively large diameter but spaced inwardly from the surface of the cell and an inner electrode 47 of a diameter sufficient to permit it to be slipped around the core 40. Preferably the electrodes 46 and 47 are formed of foraminous elements such as a screen as illustrated to facilitate the migration of water to and from the space between the electrodes and also so as to provide a lock between electrodes and gypsum. To maintain the proper spacing between the electrodes during the assembly of the stake, the outer electrode 46 is mounted on an insulating ring 48 which may be cemented to the core 40. A separate conductor or lead 49 is provided for each of the electrodes 46, 47 and which leads are led from their point of attachment to the electrode into the tube 40 through the opening 41, thence upwardly through the tube and through a cap 50 which may be threadedly or otherwise suitably secured to the top end of the tube 40 and to a suitable plug (not shown). Preferably the tube 41 is filled with wax 51 or other material so as to stabilize the position of the leads therein and also so as to prevent migration of moisture longitudinally of the stake through the core 40. The stake of the present embodiment is also provided with spacer elements 54 which, in this case, are formed of an electrical insulating, water impervious plastic such as polystyrene, eliminating any possibility of the occurrence of a "reservoir" effect as described hereinbefore. The spacer elements 54 are spaced in abutting engagement with the testing cells 42 so as to eliminate the need for separate insulating discs as were provided in the previously described embodiment. The stake may be provided with a protective lower end cap 52, preferably of an electrically non-conductive material.

The embodiment just described is preferably manufactured by assembling the electrodes and spacer elements 54 on the core 40 and thereafter filling the core with wax 51. The caps 50, 52 are then positioned on the tube and the assembly placed in a mold and the gypsum bodies 43 cast in the gaps between the spacer elements.

The advantage of the electrode structure of the last described embodiment is that the current between the electrodes 46, 47 will tend to flow directly therebetween and there is no possibility for transient current paths to develop outwardly of the stake through the surrounding soil and which may give misleading readings should they occur.

To install a stake of the invention in the soil, a cooperatively tapered hole is augered at the desired location and the stake thereafter simply inserted firmly in the hole. The tapered configuration assures that the stake will be in engagement with the soil, which is necessary, of course, to assure the proper and efficient transfer of moisture between the soil and the moisture testing cells of the stake. It will be seen that the installation may be made without disturbing the soil surrounding the stake whereby the soil in contact with a cell will be in its natural condition. Moreover, the stakes may be installed quickly and easily and may be easily removed should that become necessary for plowing or some other reason. Ordinarily, however, a stake may be left in the field throughout an irrigating season with a marker or cover placed over the top of the stake to protect it from injury.

Figure 6:
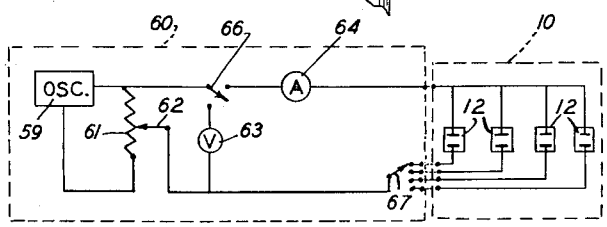
Fig. 6 is a diagrammatic view of the circuit for testing the conductivity of the cells of the stake.

Preferably the conductivity or resistivity of the cells is measured with a high frequency alternating current ohmmeter so as to negate the galvanic effect which arises between the gypsum and electrodes of a cell. The external appearance of a small portable ohmmeter of this type is shown at 60 in Fig. 1 and the circuitry is shown schematically in Fig. 6. The ohmmeter 60 comprises a battery powered vacuum tube oscillator indicated at 59, the output of which is adapted to be connected across the electrodes of a cell through a voltage divider 61 which may be adjusted to compensate for variance in strength of the battery of the oscillator so that the same potential will be applied to the cell electrodes at every reading. A controller 62 is provided for adjusting the voltage divider, and a voltmeter 63 is provided for reading the voltage output. In Fig. 6 the voltmeter 63 and an ammeter 64 are shown as separate instruments, though they are preferably incorporated in a conventional compound instrument so that a single needle 65 may be provided as shown in Fig. 1. A switch 66 is provided for alternatively connecting the voltmeter 63 or ammeter 64 into the circuit. The moisture testing cells are indicated schematically at 12 in Fig. 6. A switch 67 is provided for selectively connecting a desired one of the cells 12 into series with the ammeter 64. To measure the resistivity of the cells of a stake, the ohmmeter 60 is connected to the stake to be tested, and the switch 66 operated to place the voltmeter 63 across the output of the voltage divider 61 which is adjusted to bring the output to the desired value. Thereafter, the switch 66 is thrown to place the ammeter 64 in series with the output and the switch 67 moved to place the various moisture testing cells of a stake in series with the ammeter 64 so that the resistivity or conductivity of the cells may be measured. The readings may be made in terms of current flow and the soil moisture content computed therefrom, or the scale of the instrument may conveniently be calibrated in terms of soil moisture content. Thus the readings may be made quickly and accurately. It will be apparent that a single ohmmeter can be used to take the readings from a number of stakes.

Having illustrated and described preferred embodiments of the invention, it should be apparent to those skilled in the art that the invention permits of modification in arrangement and detail. We claim as our invention all such modifications as come within the true spirit and scope of the appended claims.

We claim:

1. Soil moisture testing apparatus comprising a plurality of frusto-conical sections arranged end to end to form a smooth surfaced, uniformly tapered stake having a top end of relatively large diameter and a bottom end of relatively small diameter and adapted to be inserted in a cooperatively tapered hole in the soil, certain of said sections comprising a body of water absorbent material capable of absorbing moisture from the soil surrounding the section and exhibiting a predictable electrical resistance for a given moisture content and having a pair of electrodes embedded therein in spaced apart relation, said stake having between each adjacent pair of said bodies at least one section of moisture impervious material whereby to prevent the migration of moisture through said stake from body to body, and conductor means extending through said stake for selectively connecting the electrode pairs to means for measuring the resistance between the electrodes of each pair.

2. A smooth surfaced stake for use in measuring the moisture content of soils comprising an elongate tubular core element and a plurality of moisture testing cells each comprising an annular body of gypsum secured to said core element in longitudinally spaced apart relation, means between each adjacent pair of cells to inhibit migration of moisture therebetween, each of said cells having a pair of electrodes embedded in the gypsum body thereof, an electrical conductor connected to each of said electrodes and extending through said core element and outwardly of one end thereof for connecting to an ohmmeter to measure the resistivity of the gypsum of a cell, and annular spacer means mounted on said core element and extending between said cells.

3. In an instrument for measuring the moisture content of soil at various depths, a stake comprising a hollow tube tubular core element, a series of annular frusto-conical sections arranged end to end on said core element to form a stake tapered smoothly from a relatively large top end to a relatively small bottom end and adapted to be inserted in a cooperatively tapered hole in the soil whereby to be positioned in snug engagement with the soil, certain of said sections being moisture testing cells and comprising a body of hygroscopic material the electrical conductivity of which varies with its moisture content and having a pair of electrodes embedded therein, said cells being spaced apart longitudinally of the stake, other of said sections being formed of moisture-impervious, electrical insulating material, at least one of said other sections being arranged in said stake between each adjacent pair of said cells, and electrical leads extending downwardly through said element and connected one to each of said electrodes for measuring the conductivity of a cell body.

4. In an instrument for measuring the moisture content of soil at various depths, a hollow tubular core element of a moisture impervious, electrical insulating material and having a longitudinally extending slit in the wall thereof, a series of frusto-conical sections arranged end to end on said core element to form a stake tapered smoothly from a relatively large top end to a relatively small bottom end and adapted to be inserted in a cooperatively tapered hole in the soil, certain of said sections being moisture testing cells and comprising a body of gypsum having a pair of electrodes embedded therein, said cells being spaced apart longitudinally of the stake, other of said sections being formed of moisture impervious, electrical insulating material, at least one of said other sections being arranged in said stake between each adjacent pair of said cells, and means for connecting said electrode pairs to a conductivity measuring instrument comprising electrical leads extending downwardly through said core element and connected one to each of said electrodes, said core element being filled with a moisture proof wax to stabilize said leads and to prevent moisture from migrating through said core whereby the moisture content of a cell will be representative of that of the soil immediately surrounding the same.

5. In an instrument for measuring the moisture content of soil at various depths, a series of frusto-conical sections arranged end to end to form a stake tapered smoothly from a relatively large top end to a relatively small bottom end and adapted to be inserted in a cooperatively tapered hole in the soil, said sections comprising alternate moisture testing cells and spacer sections, said moisture testing cells comprising a body of hygroscopic material adapted to absorb moisture from the surrounding soil, said spacer sections comprising a water impervious, electrical insulating material whereby to prevent migration of moisture from cell to cell, and means in each of said cells for sensing changes in the conductivity of said hygroscopic material.

6. An instrument as set forth in claim 5 wherein the means for sensing changes in the conductivity of said hygroscopic material comprises a pair of concentric electrodes embedded in said body, one within the other, whereby an electrical current will tend to flow directly between said electrodes on the application of electrical potential therebetween.

7. An instrument as set forth in claim 5 wherein the means for sensing changes in the conductivity of said hygroscopic material comprises a pair of electrodes including an inner electrode and an outer electrode surrounding said inner electrode, said outer electrode comprising a foraminous element whereby moisture may migrate through the openings of said element.

8. In apparatus for testing the moisture content of soil, a ground stake comprising an elongate tubular core element formed of a moisture impervious, electrical insulating material and having a longitudinally extending opening in the wall thereof, a plurality of test cells mounted on said core element each comprising an annular body of a hygroscopic material capable of absorbing moisture from the soil surrounding the same, each cell having a pair of electrodes embedded therein for measuring changes in the conductivity of said hygroscopic material, a plurality of electrical conductors connected one to each of said electrodes for connecting said electrodes to a conductivity measuring instrument, said conductors extending from one end of said core element through the same to a point opposite the electrode to which it is connected, thence through said core element opening to said electrode, said core element being filled with a moisture proof wax whereby to prevent the migration of moisture from one cell to another therethrough, and means between each adjacent pair of cells to prevent transfer of moisture therebetween.

9. A stake for use in determining the moisture content of soil at various depths, said stake having a continuous smooth surface and being conically tapered from a relatively large top end to a small bottom end and comprising a plurality of relatively axially short cell sections of gypsum spaced apart longitudinally of the stake for absorbing moisture from the soil surrounding the cell section, each of said cell sections having a pair of electrodes therein, said stake comprising a moisture impervious section immediately above and below each of said cells to prevent migration of moisture to or from a section longitudinally of the stake whereby the moisture content of a cell will be representative of the moisture content of the soil immediately surrounding the same, and conductor means extending through said stake for selectively connecting each pair of electrodes to an electrical resistance measuring instrument whereby the changes in the moisture content of the soil at the level opposite each cell may be measured by measuring the changes in the electrical resistivity of the gypsum of a cell as it gives up to or absorbs moisture from said surrounding soil.

10. A longitudinally tapered stake for a soil moisture testing apparatus comprising a plurality of longitudinally spaced apart moisture testing cells each comprising a frusto-conical body of gypsum adapted to absorb moisture from the soil surrounding the same, said bodies being of substantially the same volume whereby each cell will tend to absorb a substantially equal volume of water from the portion of the soil adjacent the same, electrode means in each of said cells for sensing changes in the conductivity of said cells, and annular spacer means mounted on said core element and extending between said cells, at least a portion of said spacer means being impervious to moisture to prevent migration of moisture between said cells.

11. Apparatus for measuring the moisture of soil at various depths comprising an elongate stake having a plurality of longitudinally spaced apart cells each comprising a body of gypsum for absorbing moisture from the soil surrounding the same, a pair of electrodes in each of said bodies, each of said electrodes comprising a pair of annular rings of lesser diameter than the corresponding body and arranged coaxially thereof in longitudinally spaced apart relation, and means between adjacent pairs of said cells to prevent migration of moisture therebetween.

12. Soil moisture testing apparatus comprising a plurality of frusto-conical sections arranged end to end to form a smooth surfaced, uniformly tapered stake having a top end of relatively large diameter and a bottom end of relatively small diameter and adapted to be inserted in a cooperatively tapered hole in the soil, certain of said sections comprising a body of water absorbent material capable of absorbing moisture from the soil surrounding the section and exhibiting a predictable electrical resistance for a given moisture content, said stake having between each adjacent pair of said bodies at least one section of moisture impervious material whereby to prevent the migration of moisture through said stake from body to body, and means in each of said bodies for sensing changes in the electrical resistance thereof.

13. Soil moisture testing apparatus comprising a plurality of sections arranged end to end to form an elongate, smooth surfaced stake adapted to be inserted in a cooperatively formed hole in the soil, certain of said sections comprising a body of water absorbent material capable of absorbing moisture from the soil surrounding the section and exhibiting a predictable electrical resistance for a given moisture content, said stake having between each adjacent pair of said bodies at least one section of moisture impervious material whereby to prevent the migration of moisture through said stake from body to body, and means in each of said bodies for sensing changes in the electrical resistance thereof.

References Cited in the file of this patent

UNITED STATES PATENTS

| | | |
|---|---|---|
| 1,391,041 | Boon et al. | Sept. 20, 1921 |
| 2,105,683 | Burdick | Jan. 18, 1938 |
| 2,526,636 | Colman | Oct. 24, 1950 |
| 2,689,479 | Feigal | Sept. 21, 1954 |

FOREIGN PATENTS

| | | |
|---|---|---|
| 540,783 | France | Apr. 22, 1922 |
| 1,028,496 | France | Feb. 25, 1953 |